Nov. 5, 1929.  A. L. BRICE  1,734,028
AUTOMATIC DRAIN VALVE
Filed June 7, 1927
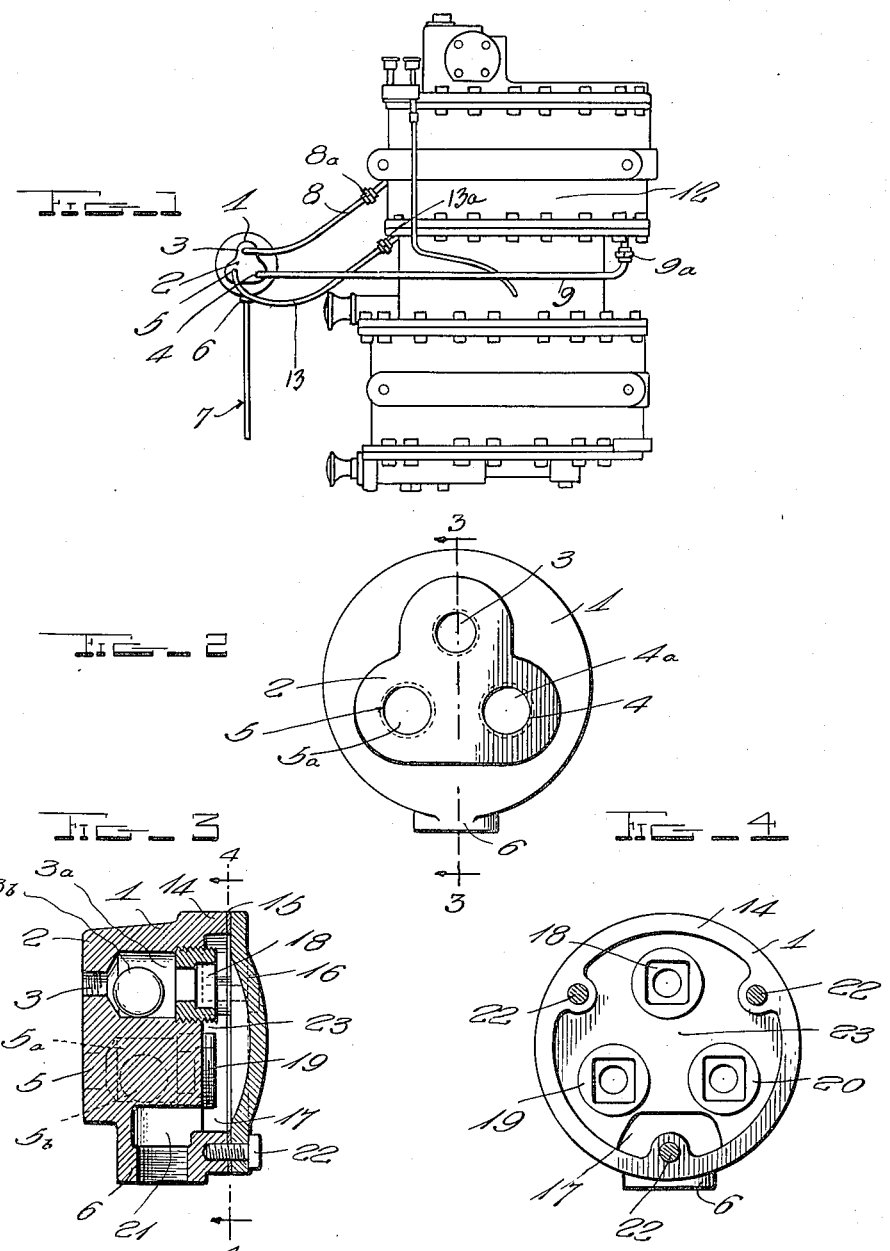
INVENTOR.
Albert L. Brice,
BY John B. Brady
ATTORNEY.

Patented Nov. 5, 1929

1,734,028

UNITED STATES PATENT OFFICE

ALBERT L. BRICE, OF FREDERICK, MARYLAND, ASSIGNOR TO THE FREDERICK IRON & STEEL COMPANY, OF FREDERICK, MARYLAND, A CORPORATION OF MARYLAND

AUTOMATIC DRAIN VALVE

Application filed June 7, 1927. Serial No. 197,154.

My invention relates broadly to automatic drain valves and more particularly to a construction of automatic drain valve for cross compound air pumps.

One of the objects of my invention is to provide a compact construction of drain valve for cross compound air pumps for effecting an automatic drain of the condensation from the cylinders of the air pump wherein a minimum number of parts are required for the drain valve, all wearing parts being readily renewable.

Another object of my invention is to provide a construction of automatic drain valve wherein a plurality of independent ball valves are positioned within a casting, the ball valves being operative against annular valve seats, the valve seats being removably secured in the casting, and providing independent passages to a common drain chamber.

Still another object of my invention is to provide a simplified construction of automatic drain valve particularly for use in cross compound air pumps, where a plurality of internal cylindrical portions are arranged within the casting and annular bushing members screw threaded into the cylinder portions providing a passage from the cylindrical portions to a common drain chamber whereby the cylinders of the cross compound air pump may be automatically drained of condensation.

My invention is directed to the construction of the drain valve described in the following specification and illustrated in the accompanying drawings in which:

Figure 1 illustrates the application of the drain valve of my invention to a cross compound air pump; Fig. 2 is a front view of the drain valve of my invention; Fig. 3 is a cross-sectional view through the drain valve on line 3—3 of Fig. 2; and Fig. 4 is a cross-sectional view taken through the drain valve on line 4—4 of Fig. 3 showing the arrangement of annular bushings or seats with the cover plate of the drain valve removed.

Referring to the drawings in more detail reference character 1 designates the main casting which forms the housing for the automatic drain valve of my invention. Reference character 2 designates a tapered portion of the valve housing to which connections from the steam line and from the high and low pressure cylinders of the cross compound air pump terminate. The tapered portion 2 is provided with screw threaded aperaures 3, 4 and 5. The steam line 8 extends from connection 8ª as shown, and terminates in the screw threaded aperture 3. The condensate from the high pressure cylinder extends from connection 13ª through pipe line 13 to the screw threaded connection 5. A pipe line 9 extends from connection 9ª in the low pressure cylinder to the screw threaded connection 4. A drain connection 7 extends from the lower screw threaded connection 6 to any desired portion under the ash pit of the boiler. The cross compound air pump has been designated generally by reference character 12. The main casting 1 is provided with an annular flange 14 thereon against which a cap or plate 16 is secured by means of screw members 22 with a gasket 15 between the plate 16 and the annular flange 14. The casting 1 terminates in a face 23 inset with respect to the extremity of the annular flange 14 providing a drain chamber 17 between the surface 23 and the interior wall of the plate 16 which chamber extends along passage 21 to the drain pipe 7 which connects to screw threaded connection 6. The casting 1 is provided with enlarged cylindrical portions 3ª, 4ª and 5ª connecting with the screw threaded apertures 3, 4 and 5 respectively, by means of tapered valve seats. The passages 3, 4 and 5 are closed by the movement of ball valves 3ᵇ, 4ᵇ (not illustrated) and 5ᵇ. The opposite ends of the cylindrical portions 3ª, 4ª and 5ª are closed by means of annular members 18, 19 and 20. Each of the members 18, 19 and 20 consists of an annular screw threaded portion with a valve seat on the inner side thereof and a socket adjacent the outer side thereof into which the headed end of a tool may be inserted for screwing the annular member into the screw threaded apertures in the surface portion 23. The drain valve is positioned at such a level with respect to the cross compound air pump that condensation is automatically drained from the low and high pressure cylinders in accordance with the cyclic operation of the driving engine. The ball valves periodically move from seats at one end of the casting 1 to seats at the opposite end of the casting formed by the annular members 18, 19 and 20 according to the variation in pressure on either side of the drain valve for freely draining the condensation from the cylinders.

The construction of drain valve illustrated in the drawings has been found to be extremely practical in its operation, and while I have described my invention in one of its preferred embodiments I desire that it be understood that modifications may be made and that no limitations upon my invention are intended other than are imposed by the scope of the appended claims.

What I claim as new and desire to secure by Letters Patent of the United States is as follows:

1. A drain valve comprising a casting, a plurality of drain connections terminating in said casting, ball valves operating in said casting individual to each of said connections, and a chamber at one side of said casting extending beneath said drain connections and common to all of said connections for providing a drain for said connections.

2. A drain valve comprising a main casting, a plurality of drain connections terminating in said casting, ball valves individual to each of said connections, annular screw threaded centrally apertured seats secured in said main casting individual to each of said ball valves, said annular seats terminating in a chamber common to all of said connections, said chamber extending substantially beneath said connections, for effecting a drain of fluid through said connections.

3. In a drain valve a main casting, a plurality of independent connections terminating in one side of said casting, cylindrical bores extending on horizontal axes within said casting and terminating in a chamber in said casting, ball valves located in each of said bores, annular valve seats closing the inner ends of all of said bores, said chamber extending substantially beneath said bores, a drain extending from the lower end of said chamber on an axis substantially perpendicular to the axis of said bores for receiving fluid released by said ball valves from the individual connections.

4. A drain valve comprising a substantially cylindrical casting having a plurality of bores extending in lines parallel to the central axis of said casting, ball valves located in each of said bores, seats at opposite ends of said bores for said ball valves, individual connections to said bores extending from one end of said bores, a chamber connected to the opposite ends of said bores and extending substantially beneath said bores at one side thereof, and a drain connection secured to the lower extremity of said chamber on an axis substantially perpendicular to the central axis of said casting.

5. A drain valve comprising a main casting having a plurality of apertures extending therethrough in lines substantially parallel to the central axis thereof, a chamber formed on one side of said casting and extending substantially beneath said apertures and common to all of said apertures, ball valves located in each of said apertures, connections extending through said apertures, and independent valve seats closing the opposite ends of the apertures and forming a passage to said chamber, and a drain connected to the lower extremity of said chamber on an axis substantially perpendicular to the central axis of said casting.

6. A drain valve comprising a casting, a plurality of valve chambers extending longitudinally through said casting along axes substantially parallel to the main axis of said casting, annular members screw threaded into the opposite ends of said chambers, an independent chamber located at the end of said casting and extending beneath said valve chambers and common to all of said valve chambers, and a drain extending from the lower extremity of said independent chamber substantially perpendicular to the axes of said valve chambers.

7. A drain valve comprising a casting, a plurality of individual chambers extending therethrough parallel to the axis of said casting, ball valves located in said chambers, individual connections to the ends of said chambers, a main chamber common to all of said aforesaid chambers, and annular valve seats screw threaded into said individual chambers and providing a passage from said individual chambers to said main chamber from said connections, said main chamber extending to a position substantially beneath said individual chambers, and a drain connected to the lower extremity of said main chamber in a direction substantially perpendicular to the axis of said casting.

8. A drain valve comprising a casting, individual valve chambers disposed in said casting along axes substantially parallel to the central axis of said casting, connections to the ends of said chambers, said casting having an annular flange extending from one side thereof, a cover plate removably secured to said annular flange and forming a chamber common to said aforementioned chambers, independent screw threaded bushings individual to each of said valve chambers positioned at the extremity of said valve chambers and providing a passage from said connections to said common chamber, said common chamber extending to a position substantially beneath said individual valve chambers and a drain connected to the lower extremity of said common chamber at a point substantially under said individual valve chambers.

In testimony whereof I affix my signature.

ALBERT L. BRICE.